United States Patent [19]
Walter et al.

[11] Patent Number: 5,764,537
[45] Date of Patent: Jun. 9, 1998

[54] TRANSMITTER FREEZE/FAULT DETECTION

[75] Inventors: Hilger A. Walter, Stade, Germany; Ronald Gagné, Midland, Mich.

[73] Assignee: The Dow Chemical Company, Midland, Mich.

[21] Appl. No.: 640,876

[22] PCT Filed: Nov. 19, 1993

[86] PCT No.: PCT/US93/11303

§ 371 Date: May 15, 1996

§ 102(e) Date: May 15, 1996

[87] PCT Pub. No.: WO95/14262

PCT Pub. Date: May 26, 1995

[51] Int. Cl.$^6$ ............................................. G06F 17/60
[52] U.S. Cl. .................. 364/554; 364/153; 364/185; 364/581
[58] Field of Search ....................... 364/554, 153, 364/571.02, 581, 582, 579, 580, 575, 185, 550, 551.01

[56] References Cited

U.S. PATENT DOCUMENTS

| 5,394,744 | 3/1995 | James et al. | 73/117.3 |
| 5,504,473 | 4/1996 | Ceci et al. | 340/541 |
| 5,514,968 | 5/1996 | Spanjers | 324/500 |

FOREIGN PATENT DOCUMENTS

Sho
60-206083  9/1985  Japan.

OTHER PUBLICATIONS

H. V. Panossian, V. R. Kemp, "Real-time fault detection of the space shuttle main engine", Proceedings of the 30$^{th}$ IEEE Conference on Decision and Control, vol. 3/3, Dec. 1991, Brighton GB, pp. 2609–2610.

*Primary Examiner*—James P. Trammell
*Attorney, Agent, or Firm*—Dale H. Schultz

[57] ABSTRACT

The method for detecting in a controlled apparatus and process the freezing or failure of a sensing process and assembly comprising a sensor generating a sensor output signal and related components converting the sensor output signal into a process signal derived from the sensor output signal, with the sensor being subjected to continuous transient variations due to process noise in the controlled apparatus and process, comprises the steps of: determining in real-time processing mode an estimate of the standard deviation of the process signal, comparing the estimate of the standard deviation of the process signal with at least one predetermined reference value, and producing an unacceptability signal if the comparison results in the determination of unacceptable deviation between the compared values. Further, an apparatus for detecting in a controlled apparatus and process the freezing or failure of a sensing process and assembly is described.

15 Claims, 2 Drawing Sheets

TRANSMITTER FREEZE/FAULT DETECTION

This application is a 371 of PCT/US93/11303 filed Nov. 19, 1993.

BACKGROUND OF THE INVENTION

The present invention generally relates to a method and an apparatus for detecting the freezing or failure of a sensing process and assembly in a controlled apparatus and process. The sensing process and assembly comprises a sensor which generates a sensor output signal which is further converted to a process signal by the sensing process and assembly, and the sensor within the sensing process and assembly is subjected to (continuous) transient variations due to process noise in the controlled apparatus and process.

In the case of process control, noise signals can either be produced in the controlled apparatus and process (to which measurements are applied) as process noise or in the measurement method (which is implemented using an extended sensing process and assembly) as measurement noise. In this connection the term "noise" is used to signify all forms of interference. It is usually not possible to identify the source of noise in a signal through the use of conventional analytical techniques on the time discrete signals themselves. Usually, noise will demonstrate an oscillatory or vibrational characteristic when a series of discrete signals is analyzed as a function of time; usually, the overall oscillatory pattern can be resolved into a set of sine waves having characteristic frequencies.

Process noise is produced from transient variations in the controlled apparatus and process itself in the regions proximate to the location of the measuring sensor. There are a variety of factors that can contribute to such variations in the controlled apparatus and process itself such as the presence of entrained gas bubbles in liquid, local variations in a liquid density as in the case of agitated oil/water mixtures, local variations in liquid temperature, turbulence, or the like.

Measurement noise is produced in each stage of the sensing process and assembly. The measurement noise is usually a function of the quality of the sensing process and assembly.

Current methods used to measure process variables such as temperature, pressure, and flow inherently yield signals which incorporate both process noise and measurement noise in their magnitude. Hence, using a process signal corrupted by noise is a long-standing problem of process control engineers. Measurement noise is normally the less significant component in the total amount of noise present in a given signal when compared to the process noise component, and the measurement noise can be reduced further by corresponding measures such as grounding of the electrical circuitry or the like. The following discussion will, therefore, focus on the process noise component and presume that the influence of the measurement noise component is essentially negligible in the application of the present invention.

In a controlled apparatus and process where a control unit or set of control units assists in the operation of a complicated machine such as a nuclear power station, automobile, turbine, chemical manufacturing process, or the like, various parameters of the process being controlled are monitored to determine the status of the process at any point in time. To this end, sensors and transducers are used to generate sensor output signals which represent the values of various attributes (such as temperature, pressure, flow rate, rpm., or vessel level) characteristic of the controlled apparatus and process.

A sensor is a device which is constructed to respond to a given event, occurrence, or state and to produce an accordingly predetermined sensor output signal representing the aforementioned state, occurrence, or event as an analog or digital signal (or, in a more virtual sense, as a numeric or Boolean quantity). The term "sensor" can also include, as a further component, a device which might be designated as an interactive measuring device which is in physical contact with the controlled apparatus and process (a transducer), and this general device will be hereinafter considered as being incorporated into the sensor.

Within the context of process control, the sensor output signal generated by the sensor then is transferred into a process signal which is the representation of the sensor output signal as a value useful in a process control decision program wherein a controlled apparatus (such as a manufacturing plant, aircraft, ship, or other such apparatus controlled by a real-time process control computer) is implemented through use of the process control decision program. A number of well-known techniques are utilized in the course of the transfer of a sensor output signal to a process signal, each being appropriate to the particular signal; some common examples of these techniques include analog to digital conversion, linearization, measurement via a Wheatstone bridge (as in the case of some weigh cells and resistance temperature devices), multiplexing, or receipt and interpretation of a serial data message from the sensor if the sensor outputs a serial data message as its sensor output signal. The implementation of these techniques can be achieved through a combination of process computer integral sensor output conditioning software means executing, in a preferred embodiment, in the computer processing unit which is executing the process control decision program.

A further consideration of the background of the invention is that the detection schema relating to a sensing process and assembly, the associated controller, and the process signal are all further associated with a process control computer which implements and executes certain of the aspects of the present invention within the context of a mode of operation generally known as real-time processing. Real-time processing is generally defined as a method of processing in which an event causes a given reaction within an actual time limit and wherein computer actions are specifically controlled within the context of and by external conditions and actual times. As an associated clarification in the realm of process control, real-time processing relates to the performance of associated process control logical, decision, and quantitative operations intrinsic to a process control decision program functioning as part of a controlled apparatus and process wherein the process control decision program is periodically executed with fairly high frequency usually having a period of between 20 ms and 2 seconds, although other time periods could be also utilized and some operations might be performed on an integer multiple of the primary process control decision program execution period for purposes related to either tuning, sensitivity, or efficient resource utilization.

In a continuously controlled process, parameters such as temperature, flow, voltage, current, rpm., height, or the like, may be monitored to determine when the process is out of tolerance.

Natural phenomena, such as noise, are usually not uniformly distributed. Instead, they are more likely to follow a normal distribution also known as Gaussian Distribution which has well-known bell-shaped distribution properties. Random numbers generated by this distribution tend to cluster about the mean or average value of the entire group. As values depart from the mean, they occur less frequently.

This means that, in a statistical context, process signals derived and resulting from the sensing process and assembly show a random variation in their values. If these process signals consistently show a normal distribution within predetermined limits, the controlled apparatus and process is considered stable and under control by a controller.

In the course of operation of the controlled apparatus and process, the sensor or the sensor output signal from the sensor can fail, can be terminated, or might be distorted due to a disruptive event or situation such as a cable break, short-circuit, freezup, or any other kind of failure, so that the sensor output signal and its further associated process signal is not representative of the status of the process being controlled and can have detrimental effects in the process control operation. The terms freezup or freezing refer to the unwanted introduction of some mechanical, electrical, or fluidic disruptive element into the sensor mechanism or sensor signal transmission mechanism which results in the sensor output signal or its associated process signal being either less dynamically responsive or not dynamically responsive in the predetermined manner for which the sensing process and assembly was designed to generate the process signal indicating the event, occurrence, or state associated with the controlled apparatus and process.

Examples of phenomena associated with the cause of freezing include short circuits, radio-frequency interference, fluidic phase changes (such as solidification of liquid tar into solid tar in a tube or pipe connecting the sensor to the controlled apparatus and process), polymerization of a monomer into a more viscous fluid in a tube or pipe connecting the sensor to the controlled apparatus and process, or agglomeration of solid particles in a tube or pipe connecting the sensor to the controlled apparatus and process.

It is therefore an object of the invention to provide an economical and straightforward method or apparatus for determining the presence of freezing or failure phenomena in either the operation of a sensor which is generating a sensor output signal or in the associated comprehensive sensing process and assembly by examining the process signal derived from the sensor output signal in a controlled apparatus and process.

SUMMARY OF THE INVENTION

According to the invention, the method for detecting probable freezing or failure phenomena in the operation of a sensor which is generating a sensor output signal or process signal derived from the sensor output signal in a controlled apparatus and process comprises the steps of determining in real-time processing mode an estimate of the standard deviation of the process signal, comparing the estimate of the standard deviation of the process signal with at least one predetermined reference value, and producing an unacceptability signal if the comparison results in the determination of unacceptable deviation between the compared values.

In a preferred embodiment, this method provides straightforward detection of freezing (or failure) phenomena either (1) in the operation of a sensor (which is generating a sensor output signal) or (2) in the operation of related components (in the overall sensing assembly) which convert the sensor output signal into a process signal when the method executes in the same real-time computer processor which stores the process signal for use by a process control decision program wherein a controlled apparatus (such as a manufacturing plant, aircraft, ship, or other such apparatus controlled by a real-time process control computer) is implemented through the use of the process control decision program.

Further embodiments of the method according to the invention are described in the claims.

The apparatus for detecting according to the invention is characterized by a means for determining in real-time processing mode an estimate of the standard deviation of a process signal, a means for comparing the estimate of the standard deviation of the process signal with at least one predetermined reference value, and a means for producing an unacceptability signal if the comparison results in a determination of unacceptable deviation between the compared values.

Further embodiments of the apparatus for detecting according to the invention are described in the claims.

It is obvious that the invention has a very wide field of use and that the method and apparatus for detecting the freezing or failure of a sensing process and assembly, a sensor associated with the sensing process and assembly, the sensor output signal generated by the sensor, or the further derived process signal generated by the sensor in a controlled apparatus and process has applicability in other fields using real-time data or frequently updated data and is not restricted to only those fields in which traditional types of sensors or transducers are used.

It will also be understood that the invention can be applied to a very large number of different kinds of sensors or transducers.

The above and further objects and advantages of the invention may be better understood by referring to the following detailed description, which should be read in conjunction with the accompanying drawings in which:

DETAILED DESCRIPTION OF THE PREFERRED EMBODIMENT

Figure 1:
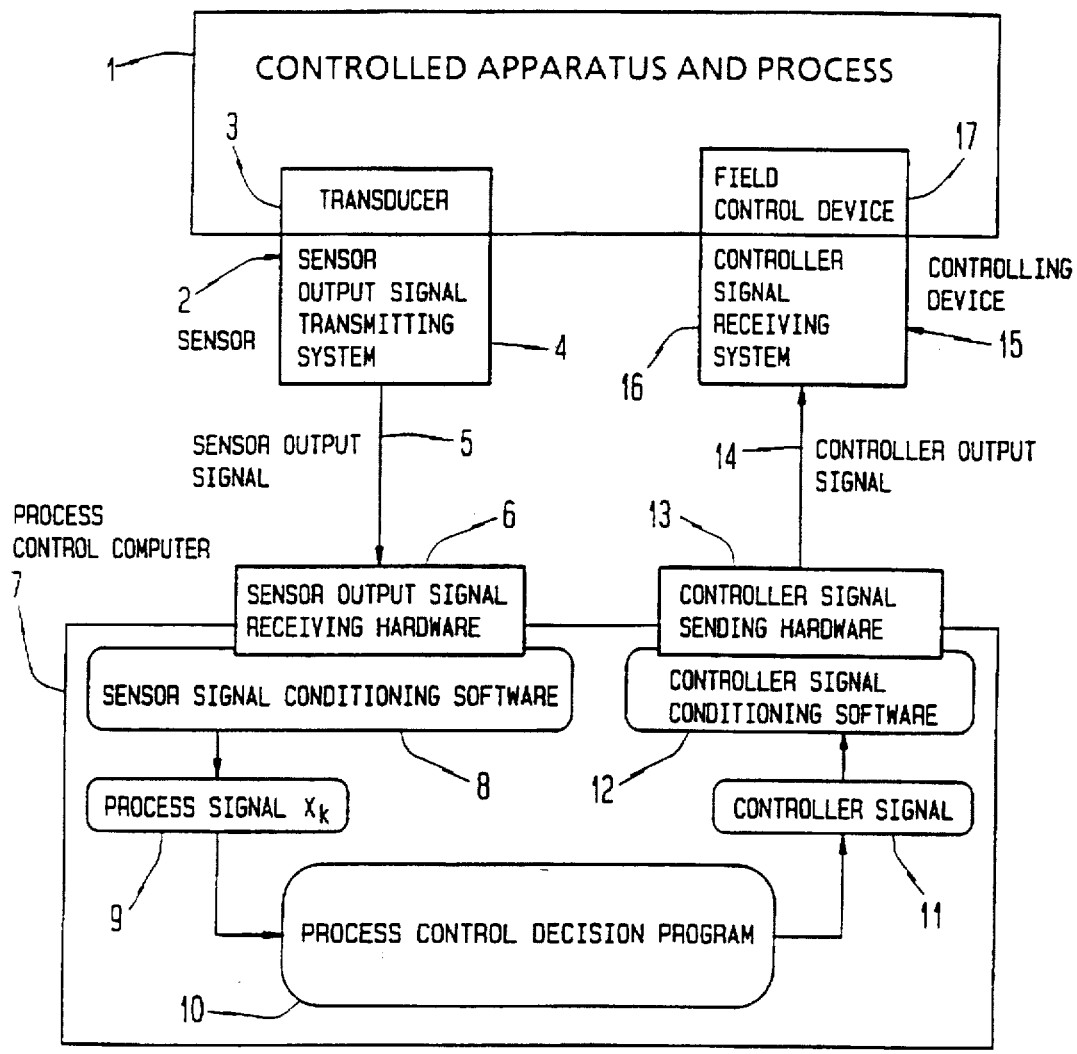
FIG. 1 shows, in a simplified block diagram form, the interrelated hardware and software components which enable the operation of a control loop incorporating a process control decision program executing in a process control computer.

FIG. 1 shows, in simplified block diagram form, a controlled apparatus and process 1 with an associated and integrally connected sensor 2, said sensor being further comprised of a transducer 3 and a sensor output signal transmitting system 4. The transducer 3 and the sensor output signal transmitting system 4 interact to generate a sensor output signal 5 according to methods which are well known in the art. The sensor output signal 5 is transferred to a sensor output signal receiving hardware 6 through a communication method which could be either based on electrical, optical, or radio-frequency means as is generally known in the art. The sensor output signal receiving hardware 6 which is attached to a process control computer 7 and a sensor signal conditioning software 8 executing in the process control computer 7 further interact to generate a process signal 9.

The process signal $x_k$ 9 can then be referenced during the execution of a process control decision program 10 executing in the process control computer 7. The process control decision program 10 will then generate a controller signal 11 in the process control computer 7. Controller signal 11 further interacts with a controller signal conditioning software 12 executing in the process control computer 7 and a closely associated controller signal sending hardware 13 which is attached to the process control computer 7 to generate a controller output signal 14 which is transmitted through a communication method (which could be either based on electrical, optical, or radio frequency means as is generally known in the art) to a controlling device 15 comprised of a controller signal receiving system 16 and a closely coupled field control device 17 affecting the controlled apparatus and process 1.

The sequence of occurrences outlined in FIG. 1 occur, in a preferred embodiment of the invention, with fairly high frequency usually having a period of between 20 milliseconds and 2 seconds, although other time periods could also be utilized. The process control computer 7 is the operative physical apparatus which dynamically executes the associated process control logical, decision, and quantitative operations intrinsic to the elements of FIG. 1.

Figure 2:
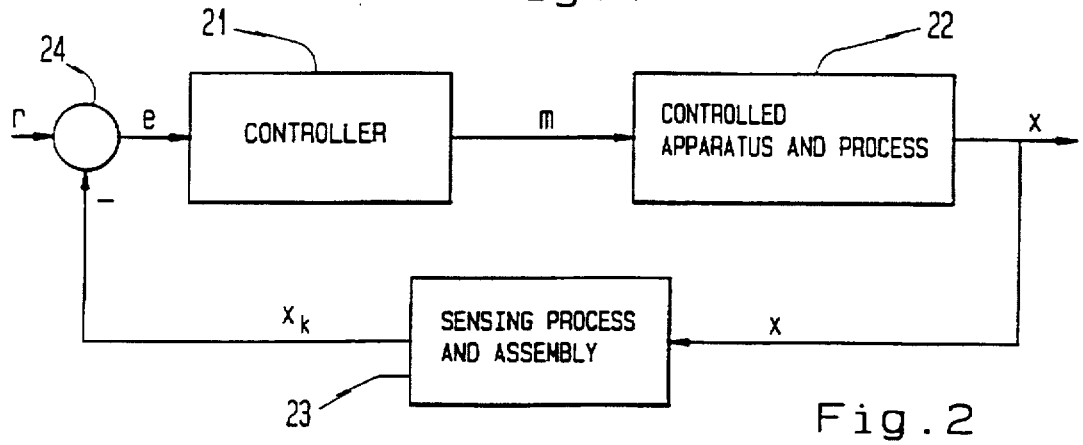
FIG. 2 shows, in a simplified block diagram form, the process dynamics and control block diagram control loop for detecting the freezing or failure of a sensing process and assembly according to the invention.

FIG. 2 shows, in a simplified block diagram form, a case of a commonly referenced process dynamics and control block diagram control loop which can be virtually associated with the control components of FIG. 1 comprising a controller 21, a controlled apparatus and process 22 (corresponding to the controlled apparatus and process 1) and a sensing process and assembly 23.

The sensing process and assembly 23 of FIG. 2 comprises the transducer 3, the sensor output signal transmitting system 4, the sensor output signal 5, the sensor output signal receiving hardware 6, and the sensor signal conditioning software 8 of FIG. 1 when interpreted in the process control and dynamics context. The controller 21 is logically resident within the process control decision program 10 of FIG. 1 and further comprises the elements of FIG. 1 which are designated as the controller signal 11, the controller signal conditioning software 12, the controller signal sending hardware 13, the controller output signal 14, the controller signal receiving system 16, and the field control device 17.

Figure 3:
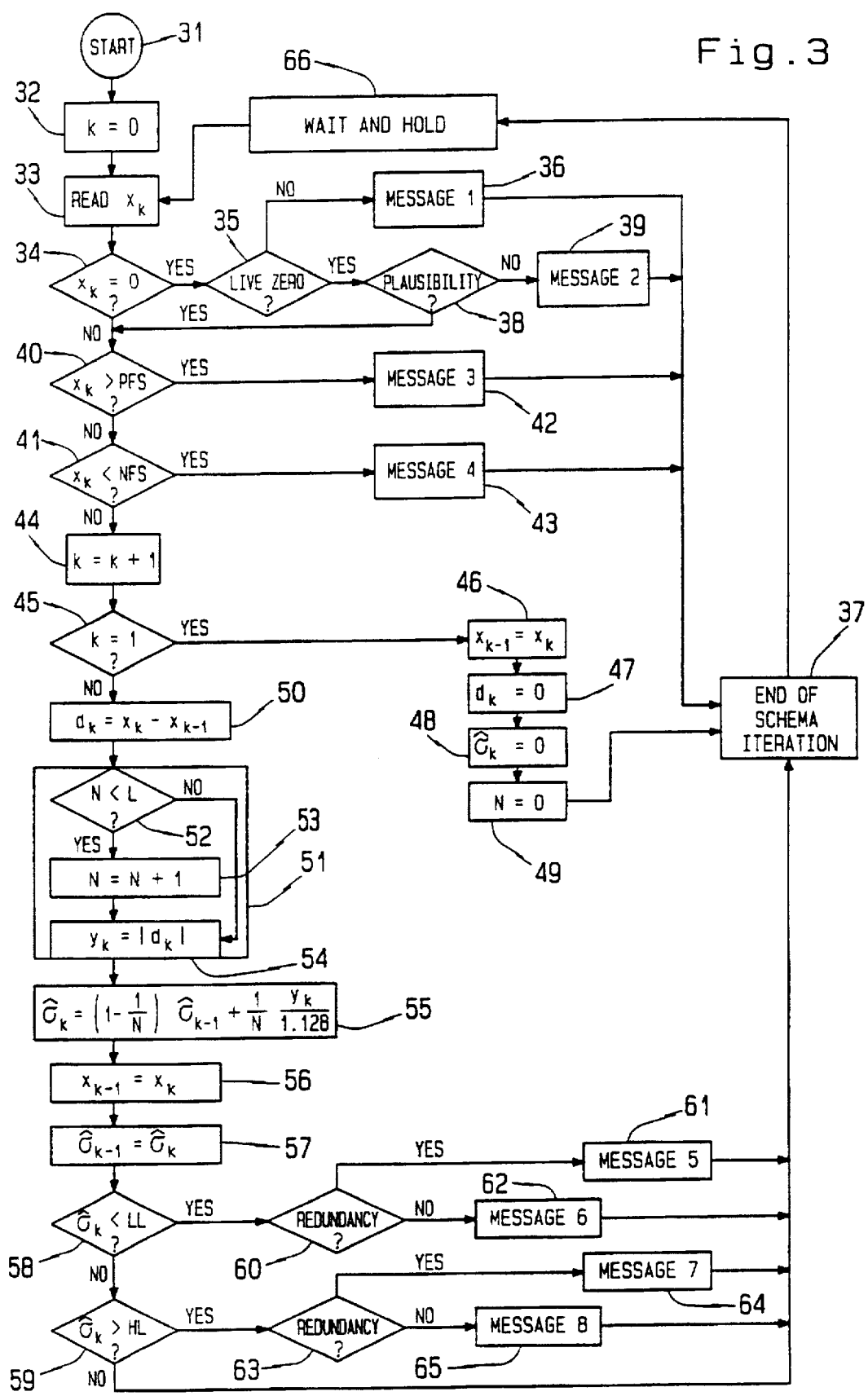
FIG. 3 is a flowchart showing the steps of the detecting method according to the present invention.

The process control computer 7 of FIG. 1 is associated with the controller 21, the sensing process and assembly 23, and a combining operator 24, shown in FIG. 2, as the operative physical apparatus which dynamically executes the associated process control logical, decision, and quantitative operations intrinsic to the elements of FIGS. 1, 2, and 3.

A reference input signal r is supplied to the combining operator 24 which can be an adder where either the reference input signal r or the process signal $x_k$ from the sensing process and assembly 23 is negated and supplied to the combining operator 24. The output from the combining operator 24 is supplied as error signal e to the controller 21 which produces a manipulated input m to the controlled apparatus and process 22 as an output from the controller 21. Note that manipulated input m (FIG. 2) to the controlled apparatus and process 22 is not the controller output signal 14 (FIG. 1), but it is the interfacing modification of the environment of the controlled apparatus and process 1 caused by the field control device 17 (for instance, the alteration of the effective inside cross sectional opening in a pipe caused by the partial closing of an analog control valve). The controlled apparatus and process 22 can be any mechanical or chemical process or system such as a reactor, a container to be filled, a thyristor, a motor, or the like. The terms "controlled apparatus and process", "controlled environment" or "controlled system" should also include situations where a human being might be part of the control loop. In this regard, FIG. 1 depicts the preferred fully automatic scenario, but should not exclude partially automated approaches.

The process attribute x to be measured and indicated by the sensing process and assembly 23 can be any intrinsic phenomena associated with the controlled apparatus and process 22 such as temperature, flow, voltage, current, rpm., height, or the like.

The invention starts from the idea that the process attribute x should have a random variation in magnitude over a period of time, and that, therefore, the sensing process and assembly 23 should output corresponding variations in the magnitude of process signal $x_k$ if sensing process and assembly 23 is working properly. As can be understood by one skilled in the art of process control, inaccurate correspondence between the process attribute x and the process signal $x_k$ in either magnitude or dynamic fidelity can diminish the appropriateness of the controller 21 to effectively operate the controlled apparatus and process 22 unless the controller 21 has a means or mechanism to effectively detect and compensate for inaccurate correspondence between the process attribute x and the process signal $x_k$. The present invention is a means and mechanism to detect such an inaccurate correspondence, and the compensation for the situation is generally understood in the art once the status indicating inaccurate correspondence between the process attribute x and the process signal $x_k$ is identified.

The sensing process and assembly 23 outputs the process signal $x_k$ to create a signal which indicates an analog value within the context of a predetermined measuring range which is limited or bounded by a negative full scale (NFS) value and a positive full scale (PFS) value.

One possible approach which can be used for detecting the amount of variation as a function of time in the process signal $x_k$ is to determine in real-time processing mode by the process control computer 7 in FIG. 1 an estimate of the standard deviation $\delta_k$ of the process signal $x_k$ and by setting a first predetermined value LL as a low limit value of the estimate of the standard deviation of the process signal and a second predetermined value Hi as a high limit value of the estimate of the standard deviation of the process signal. These various determinations are implemented within the controller 21 which is, as stated above, logically resident with process control decision program 10, which is being executed by the process control computer 7. If this estimate of the standard deviation is below the low limit value ii or above the high limit value HL, a freezing or failure of the sensor has occurred. The determination of an estimate of the standard deviation $\delta_k$ will be further described later.

Now, the detailed operation enabling the determinations of the estimate of the standard deviation and of the status of a particular signal at any given time is described by referring to FIG. 3 showing in a functional diagram (flow chart) the evaluation of the process signal $x_k$ with respect to its status regarding freezing or failure using the detection schema subpart of the controller 21 which is a critical aspect of the present invention.

The detection schema is used to evaluate the process signal $x_k$ which, in the preferred embodiment, is updated in the process control computer 7 at a sample interval (or period) $T_s$ which can be one second or any other time depending on the steadiness of the process, the measuring devices, and other circumstances. This sampled process signal $x_k$, with k being the period index of the discrete time in the process control computer 7, is one of a set of process signals ultimately supplied to the process control computer 7 as a series of time-discrete values representing a particular attribute of the controlled apparatus and process 1 for use and reference by the process control decision program 10. At the beginning of the execution of the process control decision program 10, following startup of the process control computer 7, the period index k is set equal to zero; as a practical matter, k may be adjusted or rolled over periodically to accommodate the limitations of available registers In the process control computer 7 using methods understood in the art.

The operation of the detection schema subpart of the controller 21 executes in the process control computer 7, and it begins with the "START" step 31. The period index k is set equal to the integer 0 in step 32 and the process signal $x_k$ for the current time period $T_r$ is read in a "READ $x_k$" step 33 by the detection schema subpart of the controller 21.

The process control computer 7 next examines, in step 34, the value of the process signal $x_k$ with respect to the value associated with zero magnitude for the attribute of the controlled apparatus and process 1. If the decision is YES, the status of a cable break monitor is evaluated in a "LIVE ZERO?" step 35 to establish whether the presence of an open circuit or general discontinuity is indicated (indicating failure or NO regarding the "Live Zero Test"). If the result of the "LIVE ZERO?" step 35 is NO, a first message in step 36 is output indicating a problem in the integrity of the physical components of the sensing process and assembly 23. In this regard or in regards to further use of the term, "message being output" can be any message, status indicator value output to the database of any controller 21 executing in the process control computer 7, alarm, output on the printer, red lamp, or the like being output from the detection schema to the database referenced by any controller 21 executing in the process control computer 7; furthermore, a human being might also receive an indication of the message through an appropriate interactive device. Following the generation of the output message in step 36, the detection schema then proceeds to the end of schema iteration step 37.

If an open circuit or general discontinuity is not indicated (indicating acceptability or YES regarding the "LIVE ZERO?" step 35), further evaluations of plausibility are conducted as indicated in a "PLAUSIBILITY?" step 38. Examples of these types of evaluations would include cross reference to data from other equipment, or correlation of the zero magnitude indication to momentum, heat, or mass transfer balances.

A specific scenario illustrative of cross reference to other equipment would be comparison of the process signal $x_k$ values from two identical sensors 2 dedicated to measuring the same attribute of the controlled apparatus and process 1. A specific scenario illustrative of the correlation of the zero magnitude indication to momentum, heat, or mass transfer balances would be that of a flow meter connected to a stream which is being transferred by a pump. If the flow meter indicates a value of zero flow in the stream and the amperage from the motor operating the pump indicates that the pump is operating under an elevated load, then the "PLAUSIBILITY?" step 38 should indicate a value of NO even though the "LIVE ZERO?" step 35 has a value of YES since the momentum transfer indicated from the amperage reading would indicate the presence of flow even though the flow sensor indicates a flow of zero. If the result of the "PLAUSIBILITY?" step 38 evaluation is NO, a second message in step 39 is output indicating a problem in the plausibility of the sensing process and assembly 23. The detection schema then proceeds to the end of schema iteration step 37.

If the value of the process signal $x_k$ is not zero or the result of the "PLAUSIBILITY?" step test(s) 38 is YES, the detection schema executing in the process control computer 7 next examines in step 40 whether the positive full scale PFS magnitude of the value for the process signal $x_k$ has been reached or surpassed by the process signal. This could mean that a short-circuit has occurred. In step 41 the detection schema examines whether the magnitude of the value for the process signal $x_k$ has reached or fallen below the negative full scale NFS. This could mean that a cable break, open circuit, or general discontinuity has occurred. If the determination is YES in either case, an appropriate PFS message in step 42 or NFS message in step 42 is output. In either case, the detection schema then proceeds to the end of schema iteration step 37.

If the PFS and NFS tests both generate a result of NO, the period index k is increased by the integer value of one in a "k=k+1" step 44. If period index k is equal to one (step 45) after the operation of the step 44, the prior sampling period process signal $x_{k-1}$ from the prior sampling period is set equal to process signal $x_k$ (step 46) and, in step 47, the deviation $d_k$ of the process signal $x_k$ from the prior sampling period process signal $x_{k-1}$ is set to zero; and, in step 48, the estimate of the standard deviation $\delta_k$ is set to zero (since a value of k being the integer one indicates that the detection schema is passing through its first iteration). A recency weighting variable N is also set to zero in step 49; this recency weighting variable N will be further described at a later place in this discussion of FIG. 3. The detection schema then proceeds to the end of schema iteration step 37.

If period index k is not equal to one after the operation of the step 44, the deviation $d_k$ of the process signal $x_k$ from the process signal $x_{k-1}$ from the prior sampling period is calculated according to the following formula which is executed in step 50 of the detection schema:

$$d_k = x_k - x_{k-1} \qquad (1)$$

The recency weighting variable N will now be discussed in preparation for the continued discussion of the next part of the detection schema.

In the preferred embodiment shown in FIG. 3, a critical feature of the invention is the ongoing real-time update of the estimate of the standard deviation $\delta_k$. As is well known in the art of statistics, an estimate of standard deviation is usually formally based upon a set of data values where the number of data values in the set is a discrete integer which is used as a part of the calculation of the estimate of the statistical standard deviation. In the present invention, an in real-time processing mode update of the estimate of the standard deviation $\delta_k$ is done to enable sensitivity of the method of the invention to recent values of the process signal $x_k$. However, the recency attribute in the estimate of the standard deviation $\delta_k$ is only one part of the enablement of sensitivity in the operation of the present invention; a second component in the feature of sensitivity is enabled by implicitly limiting the impact of the more senescent set of process signal $x_k$ values which are effecting the change to the estimate of the standard deviation $\delta_k$ and strongly favoring the most recent data values of process signal $x_k$. The reason for this attribute in the method derives from and is related to the fundamental negative inertial effect on response leverage which accompanies an ever-increasing set size of data incorporated into a process dynamics integral, a phenomenon which is compensated for in classical control models by the use of the proportional component in P (proportional), PI (proportional-integral), and PID (proportional-integral-derivative) controller designs and by limiting the maximum of the controller integral in the PI and PID control models.

In the context of the present invention, the estimate of the standard deviation $\delta_k$ is an estimate of standard deviation which strongly "weights" the more recent set of discrete values of process signal $x_k$ into the change rate of the estimate of the standard deviation $\delta_k$ instead of a classical equal weighting of all prior discrete values of process signal $x_k$ into the estimate of standard deviation for the set of all values of process signal $x_k$ which have been read by the detection schema; in this way, the estimate of the standard deviation is usefully sensitive because it incorporates the most recent value of process signal $x_k$ while further implicitly incorporating the additional limitation of the degree of acceptable recency of the rest of the implicit set of collected recent values of process signal $x_k$. The recency weighting variable N in the detection schema is used to create this effect in the method.

In the set of steps designated as 51 in FIG. 3, the value of N is first checked with respect to a fixed value of L in a "N<L?" step 52. (The size of L is specific to the particular process signal $x_k$ being evaluated and is selected to be appropriate for the process dynamics time constants related to each unique process signal $x_k$). If the result of the "N<L?" step 52 is YES, then the discrete value of N is permitted to increase in step 53 by a value of integer one for the particular iteration of the detection schema being implemented. However, if the result is NO, then the value of N will be limited to L in all future iterations of the detection schema. After determining the value of N, the absolute value deviation of the deviation $d_k$ (of the process signal $x_k$ from the prior sampling period process signal $x_{k-1}$) is established in step 54.

The next step in the execution of the detection schema is the calculation of the estimate of the standard deviation $\delta_k$ of the process signal $x_k$ and is determined with the context of the invention in step 55 by $$\delta_k = \left(1 - \frac{1}{N}\right) \cdot \delta_{k-1} + \frac{1}{N} \cdot \frac{y_k}{1.128} \qquad (2)$$

where:

the estimate of the standard deviation $\delta_k$ for a period index k is calculated based upon the detection schema using the recency weighting variable N, the estimate of the standard deviation $\delta_{k-1}$ from the iteration of the prior period index k-1, and the absolute value deviation $y_k$ which was earlier derived from the deviation $d_k$ (of the process signal $x_k$ from the prior sampling period process signal $x_{k-1}$) as previously described. This equation is derived from the well known statistical relationship: estimated standard deviation mean range divided by $d_2$, where $d_2$ is equal to 1.128 for a subgroup size of 2. The mean range is obtained by an infinite exponentially weighted mean series. The choice of the weight depends on the user need in balancing the sensitivity and stability of the estimated value.

Thereafter, in step 56 the process signal $x_{k-1}$ from the prior sampling period is set equal to $x_k$ and in step 57 the estimate of the standard deviation $\delta_{k-1}$ from the prior sampling period is set equal to the estimate of the standard deviation $\delta_k$ in anticipation of the coming iteration for the next period index k+1.

In order to detect the freezing or failure in the sensing process and assembly 23, the current estimate of the standard deviation $\delta_k$ of the process signal $x_k$ is evaluated for being less than the low limit value LL in step 58, and the current estimate of the standard deviation $\delta_k$ of the process signal $x_k$ is evaluated for being greater than the high limit value in step 59 if the low limit value evaluation results in a NO determination from step 58.

If the estimate of the standard deviation $\delta_k$ is less than the low limit value LL and results in a YES from step 58, an evaluation of the ability to switch over to a second or backup sensor is performed in step 60. If a YES result is determined from step 59, the controller 21 will be referenced (in a manner not described but obvious to those skilled in the art) to the alternate sensor by the output of a fifth message in step 61 indicating a problem in the integrity of the physical components of the sensing process and assembly 23 due to low limit freezing. The detection schema then proceeds to the end of schema iteration step 37.

If an alternate sensor is not available and the result from step 60 is NO, the controller 21 will be referenced (in a manner not described but obvious to those skilled in the art) through the output of a sixth message in step 62 to the need to take corrective action given the existence of low limit freezing or failure of the sensing process and assembly 23. The detection schema proceeds to the end of schema iteration step 37.

If the estimate of the standard deviation $\delta_k$ is greater than the high limit value HL and results in a YES from step 59, an evaluation of the ability to switch over to a second or backup sensor is performed in step 63. If a YES result is determined from step 63, the controller 21 will be referenced (in a manner not described but obvious to those skilled in the art) to the alternate sensor by the output of a seventh message in step 64 indicating a problem in the integrity of the physical components of the sensing process and assembly 23 due to high level deviation failure. The detection schema then proceeds to the end of schema iteration step 37.

If an alternate sensor is not available and the result from step 63 is NO, the controller 21 will be referenced (in a manner not described but obvious to those skilled in the art) through the output of an eighth message in step 65 regarding the need to take corrective action given the existence of high level deviation failure of the sensing process and assembly 23. The detection schema then proceeds to the end of schema iteration step 37.

If the estimate of the standard deviation $\delta_k$ is less than the high limit value HL and results in a NO from step 59, the detection schema proceeds to the end of schema iteration step 37.

In the end of schema iteration step 37, the detection schema implicitly or explicitly transfers execution of the statements to another subsection of either the process control decision program 10 or the controller 21 (either of which could alternatively either immediately process another process signal $z_k$ or continue to the execution of other process control decision program 10 statements) while virtually and effectively also transferring to a wait and hold step 66 in anticipation of either an event or time indicator which will initiate the "READ $x_k$" step 33 for the next iteration of the detection schema to detect the freezing or failure status of the sensing process and assembly 23 for the next process signal $x_k$ where the iteration just described as being appropriate to period index k will become appropriate to period index k-1.

In an alternative embodiment, the operations performed in steps 52 and 53 can be replaced with the use of a time delay wherein a set of time periods k equal to recency weighting variable N are permitted to pass following the "Start" step 31 prior to use of any of the messages 36, 39, 42, 43, 61, 62, 64 or 65 from the detection schema in the process control decision program 10, and the value of N is set in step 49 to a non-zero value (which will not vary during the course of the use of the schema) reflecting the desired sensitivity of the method to freezing phenomena. In this case, step 50 would exit to step 54.

What is claimed is:

1. Method for detecting in a controlled apparatus and process the freezing or failure of a sensing process and assembly comprising a sensor generating a sensor output signal and related components converting the sensor output signal into a process signal derived from the sensor output signal, with the sensor being subjected to continuous transient variations due to process noise in the controlled apparatus and process, comprising the steps of:

determining in real-time processing mode an estimate of the standard deviation of the process signal through use of a recency weighting variable which strongly favors the more recent values of said process signal in the determination of said estimate, comparing the estimate of the standard deviation of the process signal with at least one predetermined reference value, and producing an unacceptability signal if the comparison results in the determination of unacceptable deviation between the compared values.

2. Method according to claim 1, wherein a first predetermined reference value is set as a low limit (LL) value of the estimate of the standard deviation of the process signal and said unacceptability signal is produced if said estimate of the standard deviation of the process signal is less than said LL value.

3. Method according to claim 1, wherein a second predetermined reference value is set as a high limit (HL) value of the estimate of the standard deviation of the process signal and said unacceptability signal is produced if said estimate of the standard deviation of the process signal is higher than said HL value.

4. Method according to one of claims 2 or 3, wherein said unacceptability signal is produced if said estimate of the standard deviation of the process signal is less than said first predetermined value (LL value) and higher than said second predetermined value (HL value).

5. Method according to one of claims 1 to 3, wherein the estimate of the standard deviation of the process signal is calculated without the use of a squaring or square-root function.

6. Method according to claim 1, wherein the estimate of the standard deviation of the process signal is calculated according to the following equation:

$$\delta_k = \left(1 - \frac{1}{N}\right)\delta_{k-1} + \frac{1}{N} \cdot \frac{1}{1.128} |x_k - x_{k-1}|$$

where k is the time index, $\delta_k$ the current estimate of the standard deviation of the process signal, $\delta_{k-1}$ the estimate of the standard deviation of the process signal one sampling period before, N the recency weighting variable, $x_k$ the currently measured value of the process signal and $x_{k-1}$ the measured value of the process signal one sampling period before.

7. Method according to one of claims 1 to 3, wherein before starting the step of determining the estimate of the standard deviation of the process signal in real-time processing mode, it is examined whether the process signal is zero and a cable break, open circuit or general discontinuity has occurred.

8. Method according to one of claims 1 to 3, wherein before starting the step of determining the estimate of the standard deviation of the process signal in real-time processing mode, it is examined whether the process signal as reached or surpassed a predetermined positive full scale (PFS).

9. Method according to one of claims 1 to 3, wherein before starting the step of determining the estimate of the standard deviation of the process signal in real-time processing mode, it is examined whether the process signal has reached or fallen below a predetermined negative full scale (NFS).

10. Method according to one of claims 1 to 3, wherein the control loop of the control apparatus comprises the controller, the controlled apparatus and process, the sensing process and assembly and a combining operator to which a reference input signal is supplied and the output of which is connected to the controller, wherein said method Is characterized in that it is executed by a process control decision program in a process control computer being associated with the controller, the sensing process assembly and the combining operator.

11. Method according to claim 10, wherein the program is executed with fairly high frequency.

12. Method according to claim 11, wherein the program is executed with a time period between 20 milliseconds and 2 seconds.

13. Method according to claim 11, wherein the program is executed with a time period of 1 second.

14. Apparatus for detecting in a controlled apparatus and process the freezing or failure of a sensing process and assembly comprising a sensor generating a sensor output signal and related components converting the sensor output signal into a process signal derived from the sensor output signal, with the sensor being subjected to continuous transient variations due to process noise in the controlled apparatus and process, comprising:

a means for determining an estimate of the standard deviation of the process signal in real-time processing mode through use of a recency weighting variable which strongly favors the more recent values of said process signal in the determination of said estimate, a means for comparing the estimate of the standard deviation of the process signal with at least one predetermined reference value, and a means for producing an unacceptability signal if the comparison results in the determination of unacceptable deviation between the compared values.

15. Use of the apparatus of claim 14 in a control loop comprising a controller, a control apparatus and process, a sensing process and assembly and a combining operator, wherein the process signal is fed back to the controller through the sensing process and assembly and the combining operator.

* * * * *